United States Patent
Nishida et al.

(10) Patent No.: US 7,982,984 B2
(45) Date of Patent: *Jul. 19, 2011

(54) MAGNETIC TRANSFER MASTER CARRIER, MAGNETIC TRANSFER METHOD, AND MAGNETIC RECORDING MEDIUM

(75) Inventors: Yoichi Nishida, Odawara (JP); Hideyuki Kubota, Odawara (JP); Masakazu Nishikawa, Odawara (JP); Makoto Nagao, Odawara (JP); Ryuji Sugita, Hitachi (JP); Takashi Komine, Hitachi (JP)

(73) Assignee: Fujifilm Corporation, Tokyo (JP)

( * ) Notice: Subject to any disclaimer, the term of this patent is extended or adjusted under 35 U.S.C. 154(b) by 211 days.

This patent is subject to a terminal disclaimer.

(21) Appl. No.: 12/419,652

(22) Filed: Apr. 7, 2009

(65) Prior Publication Data

US 2009/0251814 A1    Oct. 8, 2009

(30) Foreign Application Priority Data

Apr. 7, 2008    (JP) ................. 2008-099621

(51) Int. Cl.
*G11B 5/86*    (2006.01)

(52) U.S. Cl. ........................................... 360/17
(58) Field of Classification Search .................. None
See application file for complete search history.

(56) References Cited

U.S. PATENT DOCUMENTS 7,218,465 B1    5/2007    Deeman et al.

FOREIGN PATENT DOCUMENTS

| JP | 2000-195048 | 7/2000 |
| JP | 2003-203325 | 7/2003 |

*Primary Examiner* — Jason Olson
(74) *Attorney, Agent, or Firm* — Young & Thompson

(57) ABSTRACT

The present invention provides a magnetic transfer master carrier which forms a magnetic pattern corresponding to a pattern of information to be recorded on a perpendicular magnetic recording medium when a magnetic field is applied to the perpendicular magnetic recording medium, with the magnetic master carrier and the perpendicular magnetic recording medium closely attached to each other, the carrier including: a base material having convex portions on its surface, the convex portions being provided corresponding to the pattern of information; a magnetic layer deposited on at least top surfaces of the convex portions, and having perpendicular magnetic anisotropy; and a soft magnetic layer deposited on the surface of the magnetic layer.

4 Claims, 8 Drawing Sheets

MAGNETIC TRANSFER MASTER CARRIER, MAGNETIC TRANSFER METHOD, AND MAGNETIC RECORDING MEDIUM

BACKGROUND OF THE INVENTION

1. Field of the Invention

The present invention relates to a magnetic transfer master carrier for magnetically transferring information to a magnetic recording medium, a magnetic transfer method using the magnetic transfer master carrier, and a magnetic recording medium produced through the magnetic transfer method.

2. Description of the Related Art

As magnetic recording media capable of recording information with high density, magnetic recording media of perpendicular magnetic recording mode (hereinafter referred to as perpendicular magnetic recording medium or media) are known. An information recording area of a perpendicular magnetic recording medium is composed of narrow tracks. Thus, as to the perpendicular magnetic recording medium, a tracking servo technology plays an important role in performing accurate scanning with a magnetic head within a narrow track width and reproducing a signal at a high S/N ratio. To perform this tracking servo, it is necessary to record servo information, for example a servo signal for tracking, an address information signal, a reproduction clock signal, etc. as a so-called preformat, at predetermined intervals on the perpendicular magnetic recording medium.

As a method for preformatting servo information on a perpendicular magnetic recording medium, there is, for example, a method wherein a master carrier having a pattern consisting of a plurality of convex portions having a magnetic layer on their surfaces, which corresponds to the servo information, is closely attached to the perpendicular magnetic recording medium, and then a recording magnetic field is applied there-to so as to magnetically transfer the servo information corresponding to the pattern of the master carrier to the perpendicular magnetic recording medium (see, Japanese Patent Application Laid-Open (JP-A) Nos. 2003-203325 and 2000-195048 and U.S. Pat. No. 7,218,465, for example).

In this method, when a recording magnetic field is applied to the perpendicular magnetic recording medium, with the magnetic master carrier and the perpendicular magnetic recording medium closely attached to each other, a magnetic flux is absorbed into the patterned magnetic layer based upon the magnetized state of the master carrier. As a result, the recording magnetic field is increased in strength according to the pattern of the master carrier. The magnetic field increased in strength in the form of the pattern enables to magnetize only predetermined regions of the perpendicular magnetic recording medium. Thus, the servo information corresponding to the pattern of the master carrier is magnetically transferred to the perpendicular magnetic recording medium.

After the magnetic transfer, the recording magnetic field is cancelled, and the master carrier which has been closely attached to the perpendicular magnetic recording medium is separated therefrom.

Conventionally, magnetic materials with high saturation magnetization have been used as materials for magnetic layers of master carriers of this type. This is because when a recording magnetic field is applied, the magnetization of the magnetic layer of the master carrier is increased so as to easily absorb a magnetic flux in the magnetic layer.

However, the magnetic layer of the master carrier is very thin, specifically, roughly several tens of nanometers in thickness, thereby strongly influenced by a demagnetizing field. Therefore, even if a magnetic material with high saturation magnetization is used as the material of the magnetic layer, an effective magnetic field (recording magnetic field) applied to the magnetic layer decreases due to the demagnetizing field, and the magnetic layer becomes unsaturated. As a result, inconveniently, the magnetization of the magnetic layer cannot be increased as much as desired.

Thus, as a material for the magnetic layer, use of magnetic materials with perpendicular magnetic anisotropy, which is hardly influenced by a demagnetizing field, is studied.

Although the magnetic layer composed of a magnetic material with perpendicular magnetic anisotropy is hardly influenced by a demagnetizing field, it causes a problem that a coercive force Hc and a residual magnetization Mr are large.

When the coercive force Hc is large, it is necessary to increase the strength of an applied magnetic field required for saturating the magnetic layer. However, due to the increased strength of the applied magnetic field, the perpendicular magnetic recording medium tends to be magnetized by a magnetic field present in regions other than the magnetic layer in the master carrier.

When the residual magnetization Mr is large, even a small shift of the position of the master carrier toward the surface of the perpendicular magnetic recording medium is likely to cause unnecessary magnetization of the perpendicular magnetic recording medium due to a residual magnetization of the magnetic layer in the master carrier, at the time of the separation of the master carrier from the perpendicular magnetic recording medium.

BRIEF SUMMARY OF THE INVENTION

The present invention aims to solve the above-mentioned problems and to achieve the following object. Specifically, an object of the present invention is to provide a magnetic transfer master carrier, provided with a magnetic layer having perpendicular magnetic anisotropy and having a reduced coercive force and a reduced residual magnetization; a method of magnetic transfer using the magnetic transfer master carrier; and a magnetic recording medium produced by using the magnetic transfer master carrier.

Means for Solving the Problems

The present inventors have extensively studied the above problems, and reached the following finding. More specifically, they have found that when a soft magnetic layer is formed on the surface of the magnetic layer formed on at least top surfaces of convex portions of a magnetic transfer master carrier, both the coercive force and the residual magnetization can be reduced.

The present invention is accomplished based on the above-mentioned finding of the present inventors, and provides the following means for solving the problems.

<1> A magnetic transfer master carrier which forms a magnetic pattern corresponding to a pattern of information to be recorded on a perpendicular magnetic recording medium when a magnetic field is applied to the perpendicular magnetic recording medium, with the magnetic master carrier and the perpendicular magnetic recording medium closely attached to each other, the carrier including:

a base material having convex portions on its surface, the convex portions being provided corresponding to the pattern of information;

a magnetic layer deposited on at least top surfaces of the convex portions, and having perpendicular magnetic anisotropy; and a soft magnetic layer deposited on the surface of the magnetic layer.

The magnetic transfer master carrier of <1> has a reduced coercive force and a reduced residual magnetization by depositing the soft magnetic layer on the magnetic layer.

<2> The magnetic transfer master carrier according to <1>, wherein the ratio w2/w1 of a thickness w2 of the soft magnetic layer to a thickness w1 of the magnetic layer and is 0.1 to 0.8.

<3> A magnetic transfer method including:

initially magnetizing a perpendicular magnetic recording medium by applying a magnetic field thereto;

closely attaching a magnetic transfer master carrier according to <1> or <2> to the initially magnetized perpendicular magnetic recording medium; and magnetically transferring information on the perpendicular magnetic recording medium by applying thereto a magnetic field whose direction is opposite to the initial magnetization, with the perpendicular magnetic recording medium closely attached to the magnetic transfer master carrier;

<4> A magnetic recording medium obtainable by a magnetic transfer method as described in <3>.

According to the present invention, it is possible to solve the problems in related art, and to provide a magnetic transfer master carrier having a magnetic layer with perpendicular magnetic anisotropy and having a reduced coercive force and residual magnetization; a method of magnetic transfer using the magnetic transfer master carrier; and a magnetic recording medium produced by using the magnetic transfer master carrier.

DETAILED DESCRIPTION OF THE INVENTION

Hereinafter, a magnetic transfer master carrier, a magnetic transfer method and a magnetic recording medium according to the present invention will be illustrated with reference to the drawings.

Figure 1A:
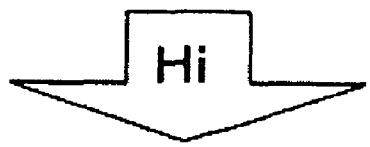
FIG. 1A is an explanatory diagram schematically showing an example of a magnetic transfer method.
Figure 1A:
Figure 1B:
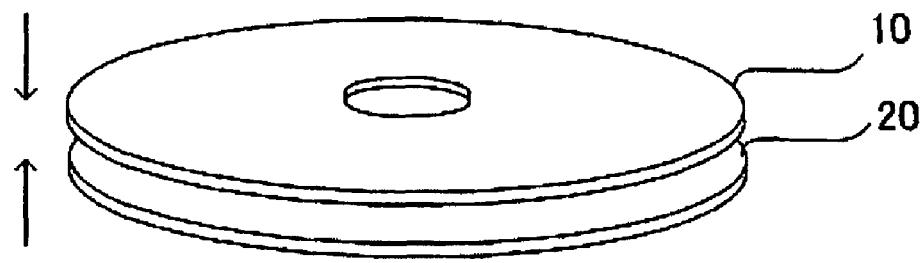
FIG. 1B is an explanatory diagram schematically showing an example of a magnetic transfer method.
Figure 1C:
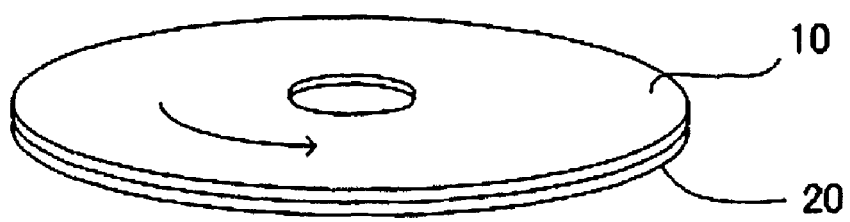
FIG. 1C is an explanatory diagram schematically showing an example of a magnetic transfer method.
Figure 1C:

FIGS. 1A to 1C are explanatory diagrams schematically showing a magnetic transfer method, in which information is magnetically transferred to a perpendicular magnetic recording medium using the magnetic transfer master carrier. The magnetic transfer method includes an initially magnetizing step, a closely attaching step, and a magnetic transfer step. At the outset, a magnetic transfer technique using the magnetic transfer master carrier will be outlined with reference to FIGS. 1A to 1C.

[Outline of Magnetic Transfer Technique]

In FIGS. 1A to 1C, a reference numeral 10 is a slave disc serving as a perpendicular magnetic recording medium, and a reference numeral 20 is a master disc serving as a magnetic transfer master carrier.

FIG. 1A is an explanatory diagram schematically showing an example of the initially magnetizing step. As shown in FIG. 1A, in the initially magnetizing step, a DC magnetic field Hi is applied to the slave disc 10, so as to initially magnetize the slave disc 10. The DC magnetic field Hi is perpendicularly applied to a flat surface of the slave disc 10.

FIG. 1B is an explanatory diagram schematically showing an example of the closely attaching step. As shown in FIG. 1B, in the closely attaching step, the master disc 20 is closely attached to the slave disc 10, which has been initially magnetized.

FIG. 1C is an explanatory diagram schematically showing an example of the magnetic transfer step. As shown in FIG. 1C, in the magnetic transfer step, a magnetic field Hd (magnetic field for recording) whose direction is opposite to the DC magnetic field Hi is applied to the slave disc 10 and the master disc 20, which are closely attached to each other, so that information based on the master disc 20 is recorded on the slave disc 10.

Next, the magnetic transfer master carrier, magnetic transfer method, and magnetic recording medium will be explained in detail with reference to the drawings.

[Magnetic Transfer Master Carrier]

Figure 2:
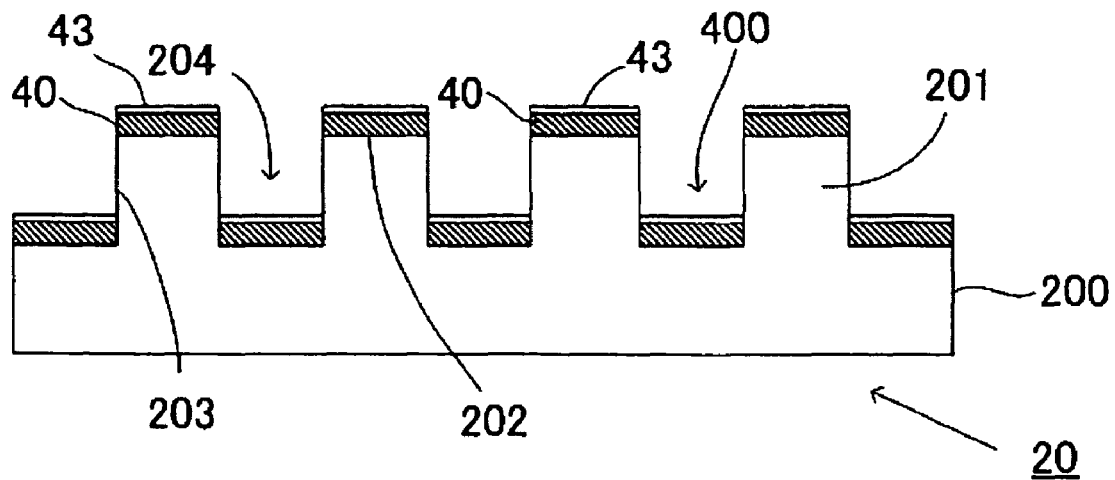
FIG. 2 is an explanatory diagram schematically showing an example of a cross-section of a magnetic transfer master carrier.

FIG. 2 is an explanatory diagram schematically showing an example of a cross-section of a magnetic transfer master carrier (master disc) 20. As shown in FIG. 2, the magnetic transfer master carrier 20 includes a base material 200, a magnetic layer 40, and a soft magnetic layer 43.

(Base Material)

The material of the base material 200 is not particularly limited and may be appropriately selected from those known depending on the purpose. Examples thereof include glass, synthetic resins such as polycarbonates, metals such as nickel and aluminum, silicon and carbon.

The shape of the base material 200 is not particularly limited and may be appropriately selected from those known depending on the purpose. An example of the magnetic transfer master carrier 20 shown in FIG. 2 is disc-shaped. The base material 200 has a plurality of convex portions 201 on its surface.

Figure 3:
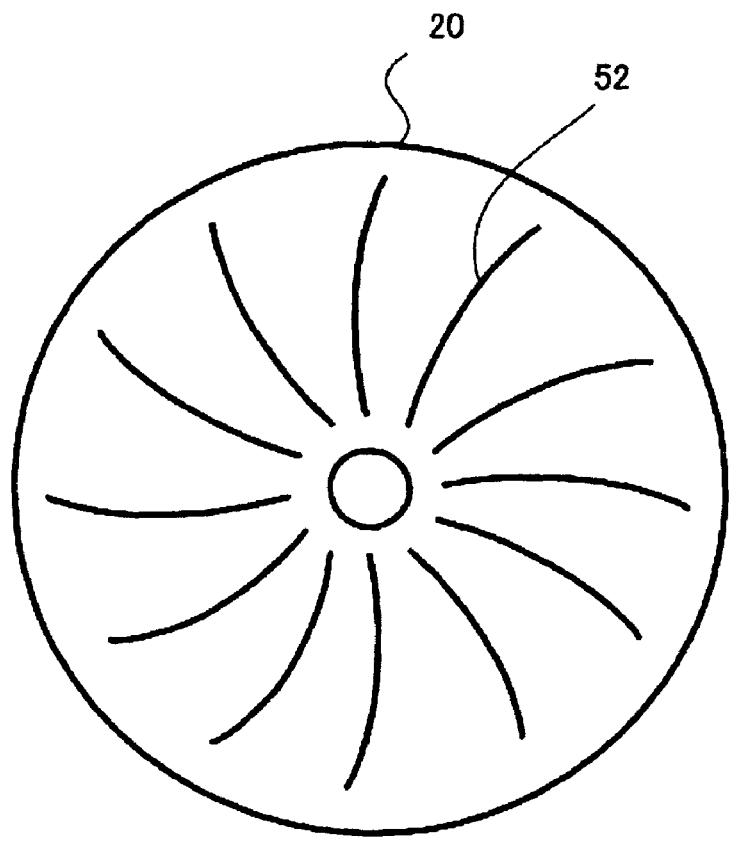
FIG. 3 is an explanatory diagram showing an example of a top surface of a magnetic transfer master carrier.

The convex portions 201 are provided on the surface of the base material 200 corresponding to a pattern of information to be recorded in the perpendicular magnetic recording medium. Examples of information to be recorded in the perpendicular magnetic recording medium include servo information for tracking servo technique, such as a servo signal and an address information signal. The convex portions 201 form a pattern corresponding to a pattern of information to be recorded on a surface of the base material 200. The number of convex portions 201 provided on the surface of the base material 200 is not particularly limited and may be appropriately selected depending on the purpose FIG. 3 is an explanatory diagram schematically showing an example of a top surface of a magnetic transfer master carrier (master disc) 20. As shown in FIG. 3, on the surface (top surface) of the magnetic transfer master carrier 20, patterns (servo pattern 52) consisting of convex portions provided corresponding to the pattern of the servo information are formed radially.

The surface of each of the convex portions 201 consists of a top surface 202 and side surfaces 203 as shown in FIG. 2. In the present embodiment, the top surface 202 is a flat surface. The shape of the top surface 202 is not particularly limited and may be appropriately selected depending on the purpose. In the present embodiment, the top surface 202 is a quadrangle (square). A concave portion 204 is formed between the convex portions 201.

(Magnetic Layer)

The magnetic layer 40 is formed at least on the top surface 202 of the surface of the convex portions 201. As shown in FIG. 2, in the present embodiment, the magnetic layer 400 is formed on a surface of the concave portion 204, in addition to the top surface 202 of the convex portions 201, because of production easiness and the like.

A material of the magnetic layer 40 includes a magnetic material having perpendicular magnetic anisotropy. The magnetic material used for the magnetic layer 40 includes an alloy and compound composed of at least one ferromagnetic metal selected from the group consisting of Fe, Co and Ni, and at least one non-magnetic material selected from the group consisting of Cr, Pt, Ru, Pd, Si, Ti, B, Ta, and O.

The magnetic layer 40 has magnetic anisotropy in a direction perpendicular to the in-plane direction of the magnetic layer 40.

The thickness w1 of the magnetic layer 40 is not particularly limited and may be appropriately set depending on the purpose. It is preferably 10 nm to 200 nm, more preferably 15 nm to 120 nm, and even more preferably 20 nm to 80 nm.

When the thickness w1 of the magnetic layer 40 is less than 10 nm, sufficient amount of magnetic flux for magnetization reversal of a slave medium cannot be gathered to magnetic convex portions. When the thickness w1 of the magnetic layer 40 exceeds 200 nm, the adjacent patterns (magnetic convex portions) tend to be connected to each other, resulting in deterioration of the shape of the convex portions and degradation of transfer quality.

The thickness w1 of the magnetic layer 40 can be measured, for example, with a stylus profiler (DEKTAK6M, produced by ULVAC, Inc.).

The thickness w1 of the magnetic layer 40 is as an average value of the thickness (average thickness). The thickness w1 is obtained by averaging the thickness measured at 12 points in total, specifically 4 points at intervals of 90 degrees in each radius of 15 mm, 22 mm and 29 mm.

If the thickness of the magnetic layer 40 is thin (less than 20 nm), other method is used to measure the thickness.

A thin flake of the cross-sectional direction of the magnetic layer 40 is prepared by an FIB process, and the thickness of the thin flake can be measured by a transmission electronic microscope (TEM).

The thickness w1 is obtained by averaging the thickness measured at 4 points in total, specifically 2 points at intervals of 180 degrees in each radius of 15 mm and 25 mm.

As a method for depositing the magnetic layer 40, for example, sputtering is used. The magnetic layer 40 can be deposited on the top surface 202 of the surface of the convex portion 201 by sputtering under the appropriately selected conditions of a film deposition pressure (Pa), a distance between a base material and a target (mm), and a DC power (W).

Figure 4A:
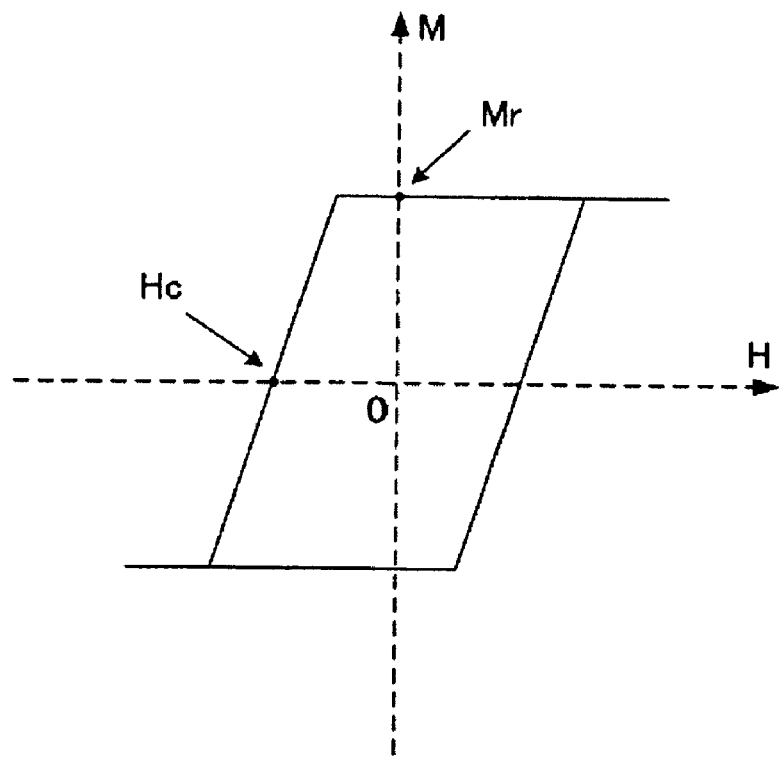
FIG. 4A is an explanatory diagram showing an example of a general M-H curve of a perpendicular magnetized film.

When the magnetic layer 40 is composed of CoPt, the perpendicular magnetic anisotropy of the magnetic layer 40 can be controlled by adjusting the film deposition pressure, Pt content, and the film deposition temperature The coercive force Hc and the residual magnetization Mr of the magnetic layer 40 are defined as follows. FIG. 4A is an explanatory diagram showing an example of a general M-H curve of a perpendicular magnetized film. Of the points at which the curve intersects the horizontal axis H, the point having a negative value is Hc, and of the points at which the curve intersects the vertical axis M, the point having a positive value is Mr.

Figure 4B:
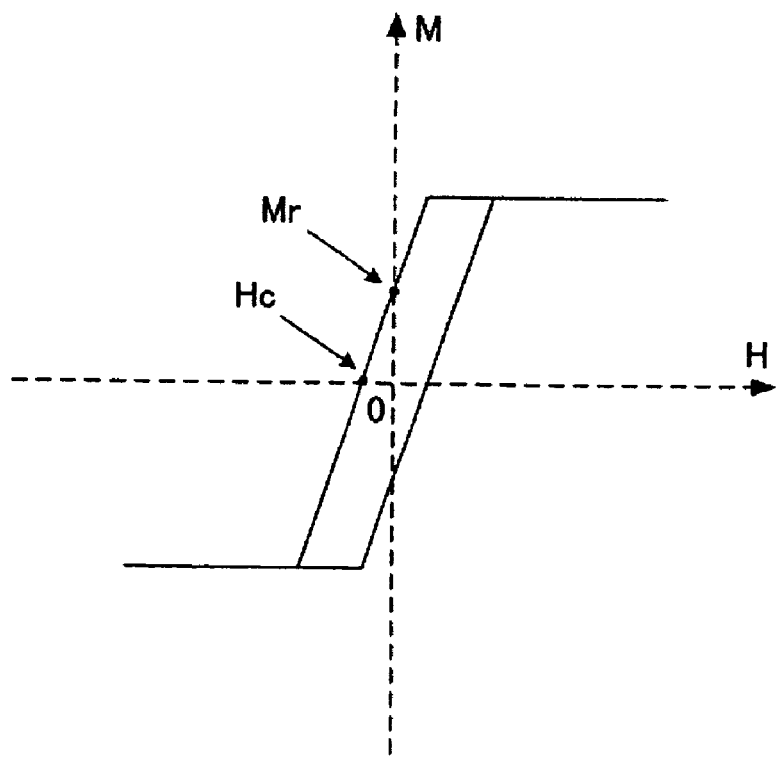
FIG. 4B is an explanatory diagram showing an example of an M-H curve of another perpendicular magnetized film.

FIG. 4B is an explanatory diagram showing an example of an M-H curve of another perpendicular magnetized film. Some perpendicular magnetized films have this type of M-H curve. Hc and Mr are defined in the same way as above.

The method for obtaining the coercive force Hc and the residual magnetization Mr is as follows.

The same layer as the magnetic layer 40 and the underlying layer of the magnetic transfer master carrier is deposited over a Si substrate of 4 inch-thick, having a 20 nm film of Ni under the same condition as that at the time of production of the master carrier. The sample formed over the Si substrate is cut into a size of 6 mm×8 mm, then a magnetic field is applied in an in-plane direction and a perpendicular direction to the cut sample, using a vibrating sample magnetometer (VSM-C7, produced by Toei Industry Co., Ltd.), and the magnetization curve of the sample are thus measured.

Based on the magnetization curves obtained, the coercive force Hc and the residual magnetization Mr are calculated.

(Soft Magnetic Layer)

The soft magnetic layer 43 is formed on the surface of the magnetic layer 40.

The material for the soft magnetic layer is not particularly limited as long as the material is a material having a low coercive force, such as a soft magnetic or semi-hard magnetic material, and may be selected appropriately depending on the purpose. Examples thereof include Fe, Fe-alloy (FeCo or FeCoNi), Co, Co-alloy (CoNi), Ni, and Ni-alloy (NiFe). Of these, preferable are FeCo and Co, which are highly saturated magnetization materials.

As a method for depositing the soft magnetic layer 40, for example, a vacuum depositing method such as sputtering, vacuum deposition and ion plating, or an electroplating may be used.

The thickness w2 of the soft magnetic layer is not particularly limited and may be set properly depending on the purpose. The thickness is preferably 1 nm to 150 nm, more preferably 2 nm to 90 nm, still more preferably 2 nm to 60 nm.

When the thickness w2 of the soft magnetic layer 43 is less than 2 nm, the layer sometimes does not function as a magnetic layer. When the thickness w2 exceeds 160 nm, the transfer quality of the adjacent pattern (magnetic convex portions) sometimes degrades.

The thickness w2 of the soft magnetic layer 43 can be measured, for example, with a stylus profiler (DEKTAK6M, produced by ULVAC, Inc.).

The thickness w2 of the soft magnetic layer 43 is as an average value of the thickness (average thickness). The thickness w1 is obtained by averaging the thickness measured at 12 points in total, specifically 4 points at intervals of 90 degrees in each radius of 15 mm, 22 mm and 29 mm.

If the thickness of the soft magnetic layer 43 is thin (less than 20 nm), other method is used to measure the thickness.

A thin flake of the cross-sectional direction of the soft magnetic layer 43 is prepared by an FIB process, and the thickness of the thin flake can be measured by a transmission electronic microscope (TEM).

The thickness w2 is obtained by averaging the thickness measured at 4 points in total, specifically 2 points at intervals of 180 degrees in each radius of 15 mm and 25 mm.

The ratio (w2/w1) between the thickness w2 of the soft magnetic layer 43 and the thickness w1 of the magnetic layer 40 is preferably 0.1 to 0.8.

The magnetic layer 40 may contain other layers such as an underlying layer and a protective layer, if needed.

(Underlying Layer)

An underlying layer may be formed under the magnetic layer 40, if needed. The material used for the underlying layer include a metal, alloy and compound composed of at least one selected from the group consisting of Pt, Ru, Pd, Co, Cr, Ni, W, Ta, Al, P, Si and Ti. As a material of the underlying layer, a platinum group metal such as Pt or Ru, or an alloy thereof is preferable. The underlying layer may be composed of a single layer or a plurality of layers. The underlying layer may be formed by known methods such as sputtering.

The thickness of the underlying layer is preferably 1 nm to 30 nm, more preferably 3 nm to 10 nm.

(Protective Layer and Other Layer)

A protective layer formed from diamond-like carbon, or the like may be formed on the soft magnetic layer 43 on the magnetic layer 40, if needed. The protective layer normally has a thickness of 10 nm or less. Further, a lubricant layer may be formed on the protective layer.

Figure 5:
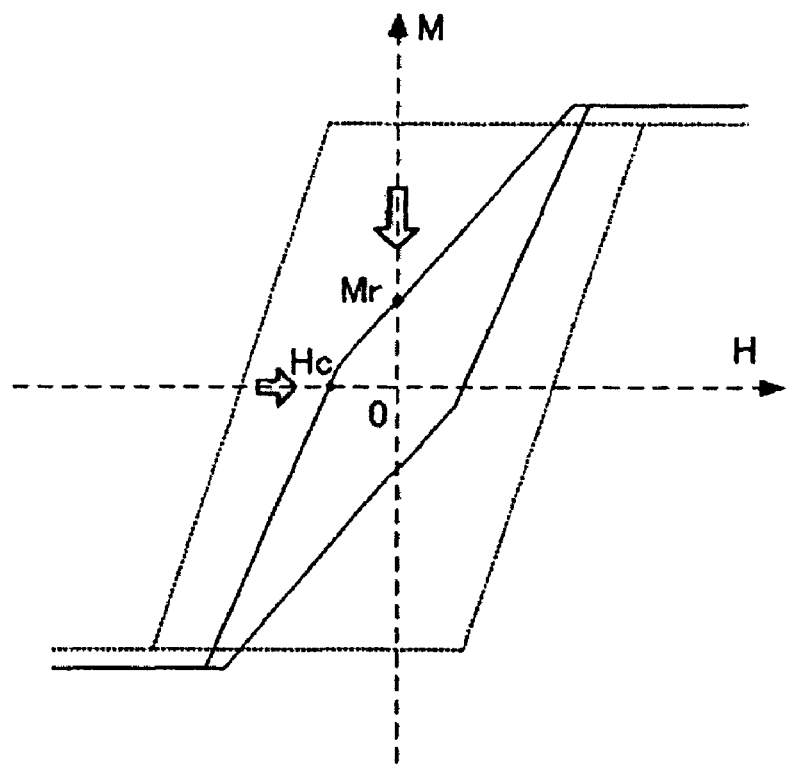
FIG. 5 is an explanatory diagram schematically showing an example of an M-H curve of a magnetic layer.

FIG. 5 is an explanatory diagram schematically showing an M-H curve of only the magnetic layer 40 of the magnetic transfer master carrier 20, and an M-H curve of the magnetic layer 40 and the soft magnetic layer 43.

In FIG. 5, the horizontal axis indicates a magnetic field H, and the vertical axis M indicates the strength of magnetization. In FIG. 5, the M-1 curve represented by solid line corresponds to the M-H curve of the magnetic layer 40 and the soft magnetic layer 43 shown in FIG. 2, and the M-H curve represented by a broken line is an M-H curve of a magnetic layer having no soft magnetic layer 43

As shown in FIG. 5, in the magnetic layer 40 in the present invention, the coercive force Hc and the residual magnetization Mr are decreased when compared to the case where the soft magnetic layer 43 is not formed.

The reason for this is considered as follows: A coupling is formed between the magnetic layer 40 and the soft magnetic layer 43, and as a result, the magnetic anisotropic energy of the magnetic layer 40 becomes smaller than that before the soft magnetic layer 43 is formed, resulting in a reduction of coercive force Hc and a reduction of residual magnetization Mr.

[Method for Producing Magnetic Transfer Master Carrier]

The magnetic transfer master carrier 20 is produced by use of an original master. An example of method for producing the original master is explained with reference to FIG. 6.

(Production of Original Master)

FIG. 6A to FIG. 6F are explanatory diagrams showing the steps for producing the original master to be used in producing the magnetic transfer master carrier 20.

Figure 6A:
FIG. 6A is an explanatory diagram showing an example of a step for producing an original master which is used for producing a magnetic transfer master carrier.
Figure 6B:
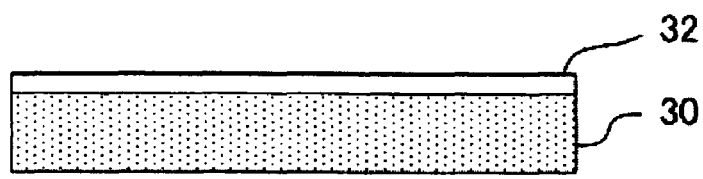
FIG. 6B is an explanatory diagram showing an example of a step for producing an original master which is used for producing a magnetic transfer master carrier.

As shown in FIG. 6A, an original plate 30 that is a surface-smoothed silicon wafer (silicon substrate) is prepared, and onto the original plate 30 is applied an electron beam resist liquid by spin coating or the like to form a resist layer 32 (see FIG. 6B), followed by a baking treatment (pre-baking) of the resist layer 32.

Figure 6C:
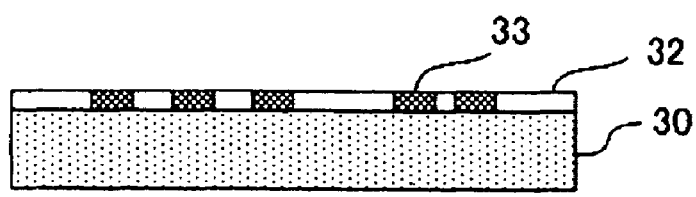
FIG. 6C is an explanatory diagram showing an example of a step for producing an original master which is used for producing a magnetic transfer master carrier.

Next, as shown in FIG. 6C, on the stage of an electron beam lithography apparatus (not shown) equipped with a high accuracy rotating stage or an X-Y stage, the original plate 30 is mounted, and an electron beam modulated correspondingly to a servo signal is irradiated to the resist layer 32, with the original plate 30 being rotated, to thereby expose and depict the pattern corresponding to the servo signal on the resist layer 32. In FIG. 6C, the reference numeral 33 denotes the exposed portions.

Figure 6D:
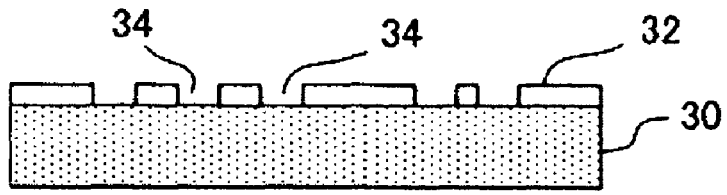
FIG. 6D is an explanatory diagram showing an example of a step for producing an original master which is used for producing a magnetic transfer master carrier.

Then, as shown in FIG. 6D, by developing the resist layer 32 and removing the exposed portions (depicted portions) 33, a patternized resist layer 32 is formed on the original plate 30.

The resist applied on the original plate 30 may be of positive type or negative type. A positive type has a exposure (depicted) pattern inverse to that of negative type.

After the developing treatment, a baking treatment is performed to strengthen the adhesive power between the resist layer 32 and the original plate 30.

Figure 6E:
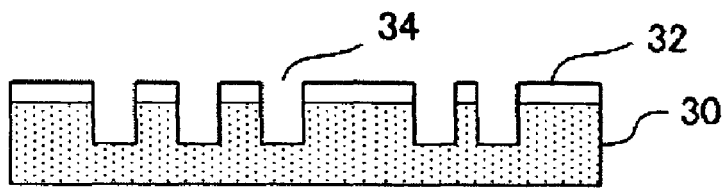
FIG. 6E is an explanatory diagram showing an example of a step for producing an original master which is used for producing a magnetic transfer master carrier.

Next, as shown in FIG. 6E, by using the resist layer 32 as a mask, the original plate 30 under the aperture portions 34 on the resist layer 32 is removed (etched) by a predetermined depth from the surface. As the etching method, it is preferable to select an anisotropic etching in order to minimize the undercut (side etch). The anisotropic etching is preferably a reactive ion etching (RIE).

Figure 6F:
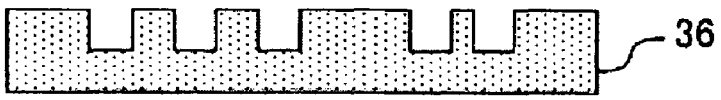
FIG. 6F is an explanatory diagram showing an example of a step for producing an original master which is used for producing a magnetic transfer master carrier.

Subsequently, as shown in FIG. 6F, the resist layer 32 is removed after the etching. As the method for removing the resist layer 32, either of a dry method such as ashing or the like and a wet method such as removal with a release solution may be used. After the removal of the resist layer 32, the original master 36 is obtained.

(Production of Magnetic Transfer Master Carrier)

An example of method of producing a magnetic transfer master carrier using the original master 36 is explained with reference to FIG. 7A to FIG. 7E.

Figure 7A:
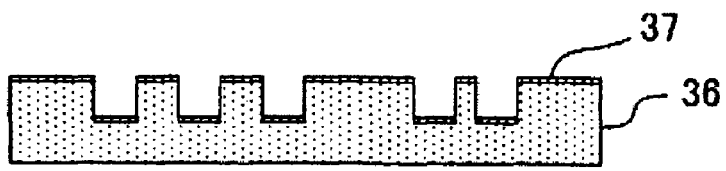
FIG. 7A is an explanatory diagram showing an example of a step for producing a magnetic transfer master carrier.

As shown in FIG. 7A, on a surface of the original master 36 a conductive layer 37 having a uniform thickness is formed.

As a method for forming the conductive layer 37, it is preferable to use various metal film forming methods may be used such as PvD (Physical vapor deposition) and CVD (Chemical vapor deposition). The conductive layer 37 is exemplified by a film containing, for example, Ni as a main component. Since such a Ni-based film is easy to mold, and is hard, it is preferable to use as the conductive film 37. The thickness of the conductive layer 37 is not particularly limited and may be selected properly depending on the purpose. The thickness may generally be several tens of nanometers.

Figure 7B:
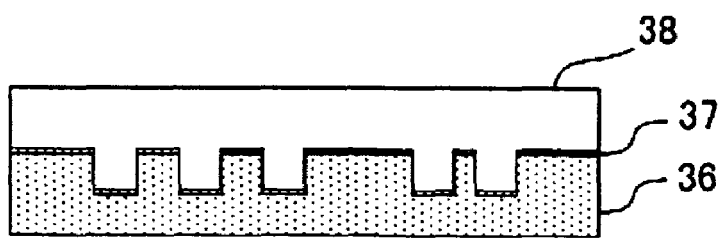
FIG. 7B is an explanatory diagram showing an example of a step for producing a magnetic transfer master carrier.

Next, as shown in FIG. 7B, a metal plate 38 having a desired thickness is formed on the surface of the original master 36 by electroforming. As a material of the metal, Ni or the like is used.

The electroforming is performed by a certain electroforming apparatus (not shown). The original master 36 is immersed in an electrolytic solution such as nickel sulfamate contained in an electrolytic tank in the electroforming apparatus. With the original master 36 serving as an anode, when the electric current is passed between the anode and a cathode (not shown), a metal plate is formed on the original master 36. The conditions of concentration, pH of the electrolytic solution, the electric current, and the like are appropriately set.

Thereafter, the original master 36 on which the metal plate 38 is formed is taken out of the electrolytic tank in the electroforming apparatus, and then immersed in a release solution, such as pure water and the like.

Figure 7C:
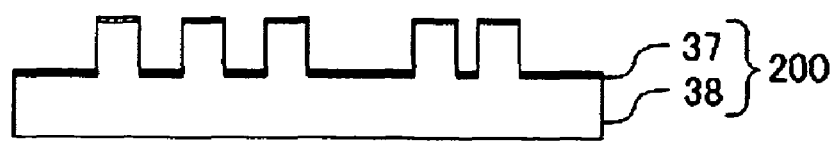
FIG. 7C is an explanatory diagram showing an example of a step for producing a magnetic transfer master carrier.

Thereafter, the original master 36 on which the metal plate 38 is formed is taken out of the electrolytic tank in the electroforming apparatus, and then immersed in a release solution, such as pure water and the like. In the release solution, the metal plate 38 is separated from the original master 36. Thus, a base material 200 having a concavo-convex shape on its surface, which is inversion of the concavo-convex shape on the surface of the original master 36, can be obtained as shown in FIG. 7C.

Figure 7D:
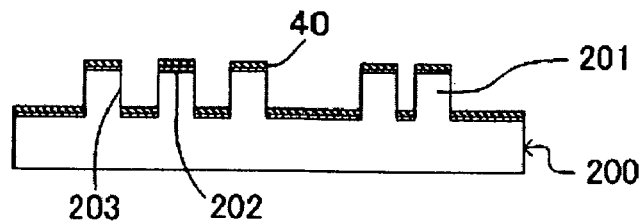
FIG. 7D is an explanatory diagram showing an example of a step for producing a magnetic transfer master carrier.

Then, as shown in FIG. 7D, the magnetic layer 40 is formed on the top surfaces 202 of the convex portions 201 on the surface of the base material 200.

The material of the magnetic layer 40 is composed of, for example, CoPt. The magnetic layer 40 is formed by a sputtering using the material as a target.

Figure 7E:
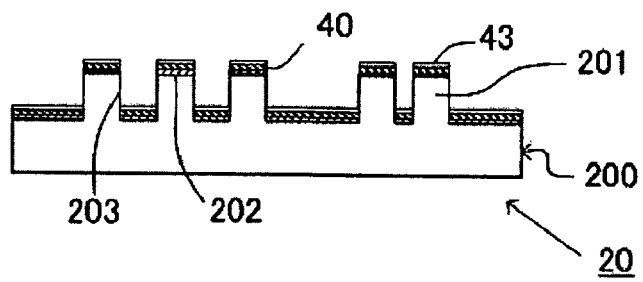
FIG. 7E is an explanatory diagram showing an example of a step for producing a magnetic transfer master carrier.

Next, as shown in FIG. 7E, a soft magnetic layer 43 is further formed on the magnetic layer 40.

The material of the soft magnetic layer 43 is composed of, for example, FeCo and Co. The soft magnetic layer 43 is formed by a sputtering using the material as a target.

If necessary, the magnetic transfer master carrier 20 is obtained, for example, by punching the base material 200 to form pieces of a predetermined size.

Perpendicular Magnetic Recording Medium

Figure 8:
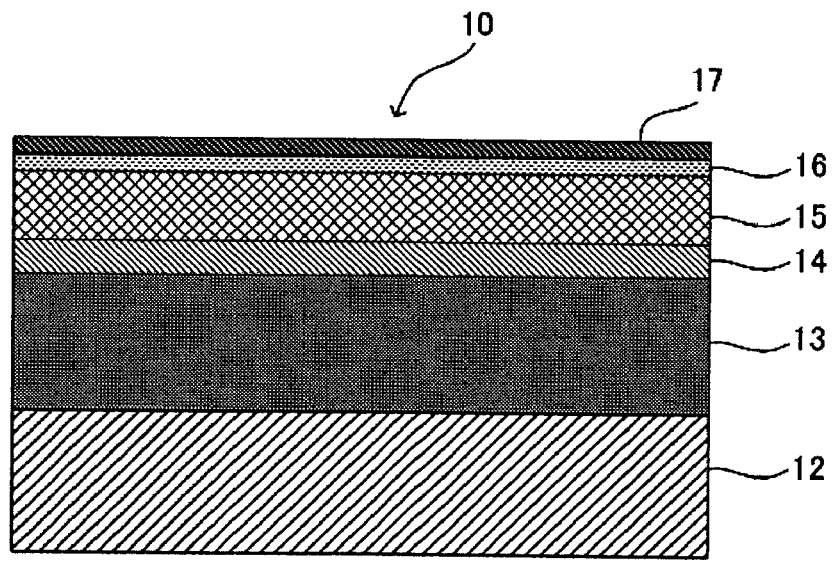
FIG. 8 is an explanatory diagram schematically showing an example of a cross-section of a perpendicular magnetic recording medium.

The perpendicular magnetic recording medium on which information is magnetically transferred using the magnetic transfer master carrier 20 is not particularly limited and may be properly selected depending on the purpose. FIG. 8 is an explanatory diagram schematically showing an example of a cross-section of the perpendicular magnetic recording medium. Here, a configuration of the perpendicular magnetic recording medium according to one embodiment will be explained with reference to FIG. 8.

As shown in FIG. 8, the perpendicular magnetic recording medium 10 includes a substrate 12, a soft magnetic layer (soft magnetic underlying layer: SUL) 13, a nonmagnetic layer (intermediate layer) 14, and a magnetic layer 15. Further, in FIG. 8, the perpendicular magnetic recording medium 10 includes a protective layer 16 and a lubricant layer 17 on the magnetic layer 15.

The substrate 12 is disc-shaped and made of a nonmagnetic material such as glass, Al (aluminum) or the like.

The soft magnetic layer 13 is formed for the purpose of, for example, stabilizing the perpendicular magnetizing state of the magnetic layer 16 and of improving sensitivity at the time of recording and reproduction. As a material for the soft magnetic layer 13, soft magnetic materials, such as CoZrNb, FeTaC, FeZrN, FeSi alloys, FeAl alloyes, FeNi alloy such as permalloy, FeCo alloy such as permendur may be used. The soft magnetic layer 13 is provided with magnetic anisotropy in radius directions (in a radial manner) from the center of the disc toward the outside.

The nonmagnetic layer 14 is provided in order to increase the magnetic anisotropy of the subsequently formed magnetic layer 15 in a perpendicular direction or for some other reasons. Examples of the material used for the nonmagnetic layer 14 include Ti, Cr, CrTi, CoCr, CrTa, CrMo, NiAl, Ru, Pd, Ta, and Pt.

The magnetic layer 15 is formed of a perpendicular magnetization film, which is configured such that magnetization easy axes in a magnetic film are oriented perpendicularly to the substrate 12, and information is recorded on the magnetic layer 15.

Examples of the material used for the magnetic layer 15 include a Co alloy such as CoPtCr, CoCr, CoPtCrTa, CoPtCrNbTa, CoCrB, CoNi, etc., Co alloy-$SiO_2$, Co alloy-$TiO_2$, Fe, and an Fe alloy such as FePt, etc.

The protective layer 16 is composed of carbon or the like, and the lubricant layer 17 is composed of a fluorine lubricant such as PFPE.

In the perpendicular magnetic recording medium 10, a magnetic layer 15 is formed over one surface of the substrate 12. However, in another embodiment, the magnetic layer 15 may be formed over both surfaces of the substrate 12.

Moreover, in another embodiment, a soft magnetic layer 13 and a nonmagnetic layer 14 may consist of a plurality of layers.

Magnetic Transfer Method

A method for magnetically transfer information on the perpendicular magnetic recording medium using the magnetic transfer master carrier will be explained.

The magnetic transfer method includes an initially magnetizing step, a closely attaching step and a magnetic transfer step, as already explained in the outline of a magnetic transfer technique. Hereinafter, the magnetic transfer method according to one embodiment will be explained with reference to FIGS. 1A to 1C and some other figures.

<Initially Magnetizing Step>

The initially magnetizing step is a step of applying a DC magnetic field Hi to the perpendicular magnetic recording medium 10 (slave disc) so as to initially magnetize the perpendicular magnetic recording medium 10.

As shown in FIG. 1A, a DC magnetic field Hi is applied to the perpendicular magnetic recording medium 10 in the initially magnetizing step. The DC magnetic field (initializing magnetic field) Hi is perpendicularly applied to a surface of the perpendicular magnetic recording medium 10. The DC magnetic field Hi is applied by a certain magnetic field applying unit (not shown). The strength of the DC magnetic field Hi is set greater than or equal to the coercive force Hc of the perpendicular magnetic recording medium 10.

Figure 9:
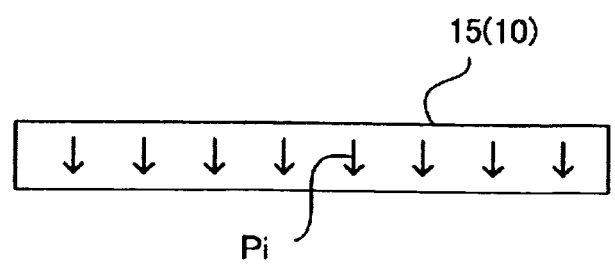
FIG. 9 is an explanatory diagram showing an example of a magnetization direction of a magnetic layer of a perpendicular magnetic recording medium which has been initially magnetized.

FIG. 9 is an explanatory diagram showing a magnetization direction of a magnetic layer of a perpendicular magnetic recording medium which has been initially magnetized. As shown in FIG. 9, the magnetic layer 15 of the perpendicular magnetic recording medium 10 is initially magnetized in one direction perpendicular to a surface of the perpendicular magnetic recording medium 10. In FIG. 9, an arrow Pi denotes a magnetization direction of the magnetic layer.

<Closely Attaching Step>

The closely attaching step is a step of closely attaching the magnetic transfer master carrier (master disc) 20 to the perpendicular magnetic recording medium 10 which has been initially magnetized.

As shown in FIG. 1B, the magnetic transfer master carrier 20 and the perpendicular magnetic recording medium 10 which has been initially magnetized are overlapped so as to be closely attached.

In the closely attaching step, the magnetic layer 40 on the convex portions 201 on the surface of the magnetic transfer master carrier 20 and the magnetic layer (recording layer) of the perpendicular magnetic recording medium 10 are closely attached to each other. The magnetic transfer master carrier 20 is closely attached to the perpendicular magnetic recording medium 10 by a predetermined pressing force.

If necessary, before the magnetic transfer master carrier 20 is closely attached to the perpendicular magnetic recording medium 10, the perpendicular magnetic recording medium 10 may be subjected to a cleaning process (burnishing) in which a minute protrusion or attached dust on its surface is removed using a glide head, a polisher or the like In the closely attaching step, as shown in FIG. 1B, in this embodiment, the magnetic transfer master carrier 20 is closely attached to one surface of the perpendicular magnetic recording medium 10. However, in another embodiment, the magnetic transfer master carrier 20 may be closely attached to both surfaces of the perpendicular magnetic recording medium (slave disc) having the magnetic layer on both surfaces.

<Magnetic Transfer Step>

The magnetic transfer step is a step of applying a recording magnetic field Hd, which is generated in the opposite direction to the direction of the initializing magnetic field Hi, to the perpendicular magnetic recording medium 10 and the magnetic transfer master carrier 20 which have been closely attached to each other, so as to record information based on the magnetic transfer master carrier 20 in the perpendicular magnetic recording medium 10.

As shown in FIG. 1C, to the perpendicular magnetic recording medium 10 and the magnetic transfer master carrier 20 which have been closely attached to each other, a recording magnetic field Hd is generated in the opposite direction to the direction of the initializing magnetic field Hi by a magnetic field applying unit (not shown).

Figure 10:
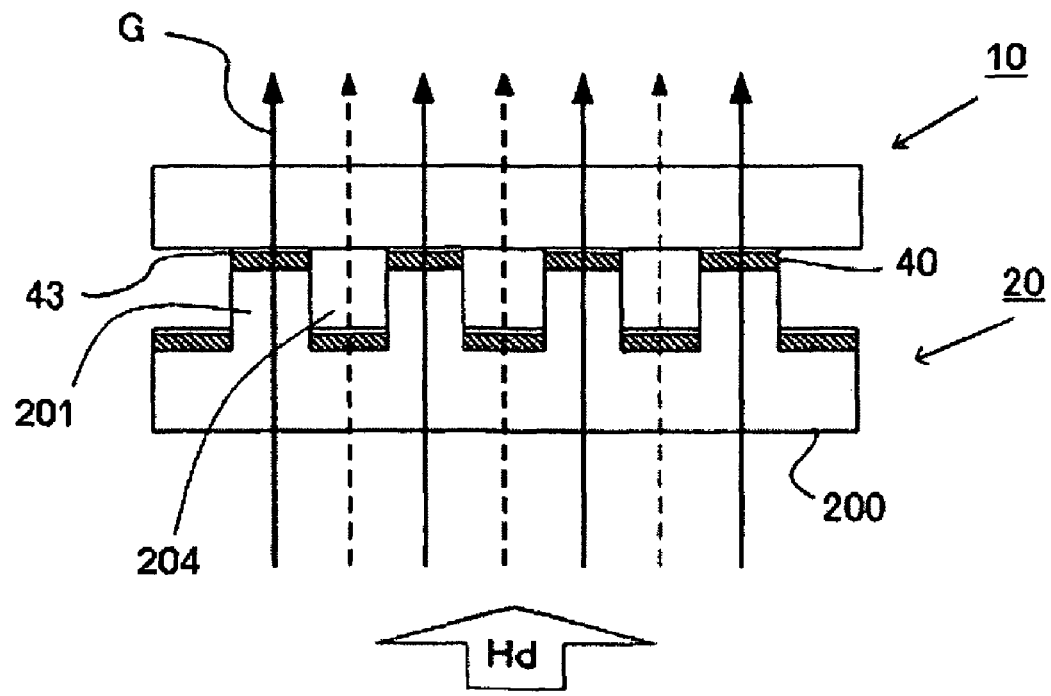
FIG. 10 is an explanatory diagram showing an example of a cross-section of a perpendicular magnetic recording medium and a magnetic transfer master carrier in a magnetic transfer step.

FIG. 10 is an explanatory diagram showing an example of a cross-section of the perpendicular magnetic recording medium 10 and the magnetic transfer master carrier 20 in the magnetic transfer step. As shown in FIG. 10, when the recording magnetic field Hd is applied to the perpendicular magnetic recording medium 10 and the magnetic transfer master carrier 20 which have been closely attached to each other, a magnetic flux G generated by the magnetic field Hd enters the magnetic transfer master carrier 20 and then absorbed in the magnetic layer 40 of the magnetic transfer master carrier 20. As a result, the magnetic field becomes strong in a region of the convex portion 201 of the magnetic transfer master carrier 20. On the other hand, the magnetic field in a region of the concave portion 204 of the magnetic transfer master carrier 20 becomes weaker than that in the region of the convex portion 201. Thus, a pattern of the magnetic field is formed correspondingly to information to be recorded in the perpendicular magnetic recording medium 10.

As a result, in the region corresponding to the convex portion 201 the magnetization direction of the magnetic layer 15 of the perpendicular magnetic recording medium 10 is inverted so as to record information. Meanwhile, in the region corresponding to the concave portion 204 the magnetization direction of the magnetic layer 15 is not inverted.

Figure 11:
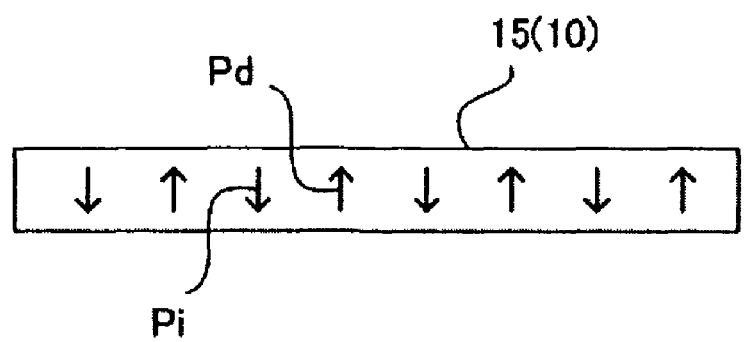
FIG. 11 is an explanatory diagram showing a magnetization direction in a magnetic layer of a perpendicular magnetic recording medium after magnetic transfer.

FIG. 11 is an explanatory diagram showing a magnetization direction in the magnetic layer of the perpendicular magnetic recording medium after a magnetic transfer step. As shown in FIG. 11, in the magnetic layer 15 of the perpendicular magnetic recording medium 10, information such as a servo signal, is recorded as a recording magnetization Pd which acts in the opposite direction to the direction of the initial magnetization Pi.

The recording magnetic field Hd is appropriately selected depending on the purpose. Generally, it is preferably 40% to 130%, and more preferably 50% to 120%, of the coercive force Hc of the magnetic layer 15 in the perpendicular magnetic recording medium 10.

When information is recorded (magnetically transferred) in the perpendicular magnetic recording medium 10 using the magnetic transfer master carrier 20, the recording magnetic field Hd may be applied to the perpendicular magnetic recording medium 10 and the magnetic transfer master carrier 20 which have been closely attached to each other by the magnetic field applying unit while they are rotated by a certain rotating unit (not shown). In another embodiment, a mechanism for rotating the magnetic field applying unit may be provided such that the magnetic field applying unit is rotated relatively to the perpendicular magnetic recording medium 10 and the magnetic transfer master carrier 20.

Figure 12:
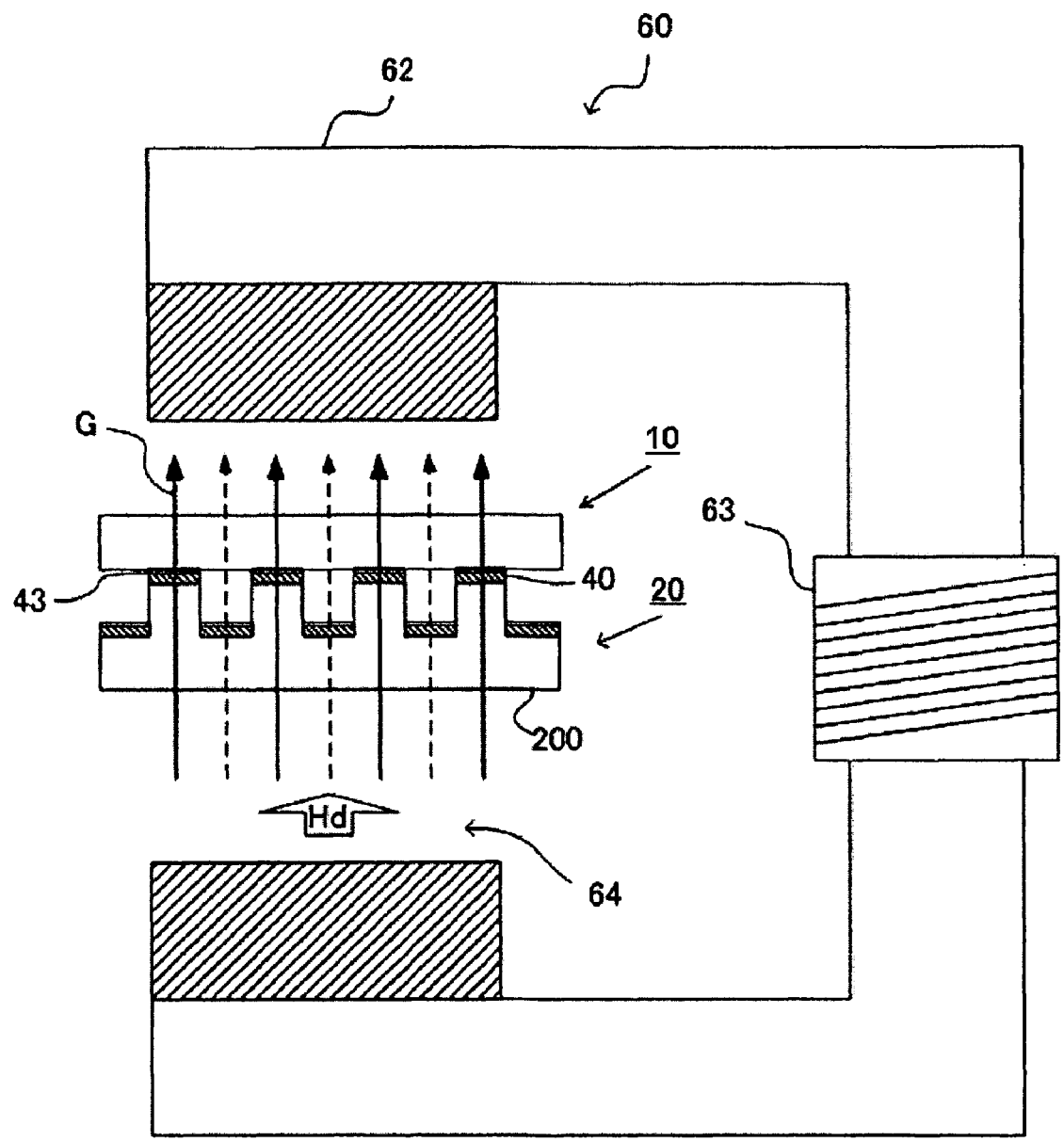
FIG. 12 is an explanatory diagram schematically showing an example of a magnetic transfer apparatus.

FIG. 12 is an explanatory diagram schematically showing an example of a magnetic transfer apparatus. The magnetic transfer apparatus includes a magnetic field applying unit 60 composed of an electromagnet which is formed by winding a coil 63 around a core 62. Upon application of an electric current to the coil 63, a magnetic field is generated in a gap 64 perpendicularly to the magnetic transfer master carrier 20 and the perpendicular magnetic recording medium 10 which has been closely attached to each other. The direction of the magnetic field generated can be changed depending upon the direction of the electric current applied to the coil 63. Therefore, this magnetic transfer apparatus makes it possible to initially magnetize the perpendicular magnetic recording medium 10 and also to perform magnetic transfer.

A perpendicular magnetic recording medium, recorded by means of the magnetic transfer master carrier 20, is installed in a magnetic recording and reproducing device such as a hard disc device, and used. The perpendicular magnetic recording medium is used to achieve a high-recording-density magnetic recording and reproducing device with high servo precision and excellent recording and reproducing properties.

EXAMPLES

Hereinafter, Examples of the present invention will be described, which however shall not be construed as limiting the scope of the present invention.

Example 1

Magnetic Transfer Master Carrier 1
(Production of Original Master)

An electron beam resist was applied onto an 8 inch Si wafer (an original plate) by spin coating so as to have a thickness of 100 nm. Then, the resist on the original plate was irradiated with an electron beam modulated corresponding to servo information etc. using a rotary electron beam exposure apparatus, so as to expose the resist. Thereafter, the exposed resist was developed, and then unexposed regions were removed so as to form a pattern of the resist on the original plate.

Next, the original plate was subjected to reactive etching, with the patterned resist used as a mask to etch away regions not masked with the resist. After the etching, the resist remaining on the original plate was removed by washing with a solvent. Then, the original plate was dried so as to obtain an original master for producing a magnetic transfer master carrier.

(Production of Magnetic Transfer Master Carrier)

On the original master a Ni conductive layer having 10 nm-thick was deposited by sputtering. Thereafter, a Ni layer was deposited over the original master by electroforming, with the original master on which the conductive layer had been formed used as a matrix. Then, the Ni layer was separated from the original master, and subjected to washing and other treatments so as to obtain a Ni base material having convex portions on its surface.

Next, the Ni base material was placed in a certain chamber, and then a Ta film and Pt film as an underlying layer and CoPt film ($Co_{80}Pt_{20}$ atomic %) as a magnetic layer were each deposited on the top surfaces of the convex portions of the Ni base material by sputtering (Ta film: 10 nm; Pt film: 10 nm).

The film deposition condition was as follows.

<Film Deposition Condition>

(Ta Film)

| | |
|---|---|
| Target material: | Ta |
| Film deposition pressure: | 2.0 Pa |
| Distance between the Ni base material and a target: | 200 mm |
| DC power: | 350 W |

(Pt Film)

| | |
|---|---|
| Target material: | Pt |
| Film deposition pressure: | 2.0 Pa |
| Distance between the Ni base material and a target: | 200 mm |
| DC power: | 400 W |

(CoPt Film)

| | |
|---|---|
| Target material: | CoPt |
| Film deposition pressure: | 2.0 Pa |
| Distance between the Ni base material and a target: | 200 mm |
| DC power: | 1,000 W |
| Thickness w1 of the magnetic layer: | 20 nm |

After the magnetic layer was deposited, FeCo film as a soft magnetic layer was deposited on the magnetic layer by sputtering. The film deposition condition was as follows.

<Film Deposition Condition>

| | |
|---|---|
| Film deposition pressure: | 0.2 Pa |
| Distance between the Ni base material and a target: | 200 mm |
| DC power: | 1,000 W |
| Thickness w2 of the soft magnetic layer: | 2 nm |

As mentioned above, a magnetic transfer master carrier was produced.

(Perpendicular Magnetic Recording Medium)

Over a 2.5 inch-thick glass substrate, each layer was deposited by the following process so as to produce a perpendicular magnetic recording medium.

The produced perpendicular magnetic recording medium includes a soft magnetic layer, a first nonmagnetic orientation layer, a second nonmagnetic orientation layer, a magnetic layer, a protective layer, and a lubricant layer in this order.

The soft magnetic layer, the first nonmagnetic orientation layer, the second nonmagnetic orientation layer, the magnetic layer and the protective layer were deposited by sputtering, and the lubricant layer was deposited by dipping.

(Deposition of Soft Magnetic Layer)

As the soft magnetic layer, a 100 nm-thick CoZrNb film was deposited.

Specifically, the soft magnetic layer was deposited in such a manner that the glass substrate was placed facing a CoZrNb target, Ar gas was flowed at a pressure of 0.6 Pa and electric discharge was performed at a DC power of 1,500 W.

(Deposition of First Nonmagnetic Orientation Layer)

As the first nonmagnetic orientation layer, a 5 nm-thick Ti film was deposited.

Specifically, the first nonmagnetic orientation layer was deposited in such a manner that the glass substrate, on which the soft magnetic layer was deposited, was placed facing a Ti target, Ar gas was flowed at a pressure of 0.5 Pa and electric discharge was performed at a DC power of 1,000 W.

(Deposition of Second Nonmagnetic Orientation Layer)

As the second nonmagnetic orientation layer, a 6 nm-thick Ru film was deposited.

Specifically, the second nonmagnetic orientation layer was deposited in such a manner that the glass substrate, over which the soft magnetic layer and the first nonmagnetic orientation layer were deposited, was placed facing a Ru target, Ar gas was flowed at a pressure of 0.8 Pa and electric discharge was performed at a DC power of 900 W (Deposition of Magnetic Layer)

As the magnetic layer, a 18 nm-thick CoCrPtO film was deposited.

Specifically, the magnetic layer was deposited in such a manner that the glass substrate, over which the soft magnetic layer, the first nonmagnetic orientation layer and the second nonmagnetic orientation layer were deposited, was placed facing a CoCrPtO target, Ar gas containing 0.06% of $O_2$ was flowed at a pressure of 14 Pa and electric discharge was performed at a DC power of 290 W (Deposition of Protective Layer)

As a protective layer, a 4 nm-thick carbon film (C film) was deposited.

Specifically, the protective layer was deposited in such a manner that the glass substrate, over which the soft magnetic layer, the first nonmagnetic orientation layer, the second nonmagnetic orientation layer and the magnetic layer were deposited, was placed facing a carbon target (C target), Ar gas was flowed at a pressure of 0.5 Pa and electric discharge was performed at a DC power of 1,000 W.

(Deposition of Lubricant Layer)

As the lubricant layer, a 2 nm-thick layer composed of PFPE lubricant was deposited on the protective layer.

The coercive force of the perpendicular magnetic recording medium was 334 kA/m (4.2 kOe).

Magnetic Transfer (Initially Magnetizing Step)

A magnetic field was applied to the perpendicular magnetic recording medium so as to initially magnetize the perpendicular magnetic recording medium. The strength of the magnetic field applied in the initially magnetizing step was 10 kOe.

(Closely Attaching Step)

The magnetic transfer master carrier was closely attached to the perpendicular magnetic recording medium which had been initially magnetized, at a pressure of 9 kg/cm².

(Magnetic Transfer Step)

A recording magnetic field was applied to the perpendicular magnetic recording medium and the magnetic transfer master carrier which had been closely attached to each other. The strength of the recording magnetic field was 3.6 kOe.

Thereafter, the application of the recording magnetic field was stopped, and then the magnetic transfer master carrier was separated from the perpendicular magnetic recording medium.

Evaluation 1
(Coercive force Hc and Residual Magnetization Mr of Magnetic Transfer Master Carrier 1)

After the application of the recording magnetic field was stopped, a coercive force Hc and a residual magnetization Mr in the magnetic layer of Magnetic Transfer Master Carrier 1 which had been separated from the perpendicular magnetic recording medium, was evaluated.

The coercive force He and the residual magnetization Mr were measured using a vibrating sample magnetometer (VSM-C7, produced by Toei Industry Co., Ltd.).

The results are shown in Table 1.

Evaluation 2
(Servo Signal Quality of Magnetic Recording Medium After Magnetic Transfer)

After the magnetic transfer was performed, the quality of the servo signal recorded on the perpendicular magnetic recording medium was evaluated. Specifically, the quality of the servo signal was evaluated by detecting a TAA (Track Average Amplitude) reproduction output of the preamble portion over whole sector at a position of radius 15 mm, and calculated the SNR (SIN ratio). As an apparatus for the evaluation, LS-90 (produced by Kyodo Denshi) was used with a GMR head having a lead width of 120 nm and a light width of 200 nm. The results are shown in Table 1.

Example 2

(Magnet Transfer Master Carrier 2)

A magnetic layer was deposited under the same condition as in Example 1 on the Ni base material produced in the same manner as in Example 1. Then, a FeCo film as a soft magnetic layer was deposited by sputtering. The deposition condition was as follows.

| <Deposition Condition> | |
|---|---|
| Film deposition pressure: | 0.2 Pa |
| Distance between the Ni base material and a target: | 200 mm |
| DC power: | 1,000 W |
| Thickness w2 of the soft magnetic layer: | 5 nm |

Example 3

(Magnet Transfer Master Carrier 3)

A magnetic layer was deposited under the same condition as in Example 1 on the Ni base material produced in the same manner as in Example 1. Then, a FeCo film as a soft magnetic layer was deposited by sputtering The deposition condition was as follows.

| <Deposition Condition> | |
|---|---|
| Film deposition pressure: | 0.2 Pa |
| Distance between the Ni base material and a target: | 200 mm |
| DC power: | 1,000 W |
| Thickness w2 of the soft magnetic layer: | 10 nm |

Example 4

(Magnet Transfer Master Carrier 4)

A magnetic layer was deposited under the same condition as in Example 1 on the Ni base material produced in the same manner as in Example 1. Then, a FeCo film as a soft magnetic layer was deposited by sputtering. The deposition condition was as follows.

| <Deposition Condition> | |
|---|---|
| Film deposition pressure: | 0.2 Pa |
| Distance between the Ni base material and a target: | 200 mm |
| DC power: | 1,000 W |
| Thickness w2 of the soft magnetic layer: | 15 nm |

Example 5

(Magnet Transfer Master Carrier 5)

A magnetic layer was deposited under the same condition as in Example 1 on the Ni base material produced in the same manner as in Example 1. Then, a FeCo film as a soft magnetic layer was deposited by sputtering. The deposition condition was as follows.

| <Deposition Condition> | |
|---|---|
| Film deposition pressure: | 0.2 Pa |
| Distance between the Ni base material and a target: | 200 mm |
| DC power: | 1,000 W |
| Thickness w2 of the soft magnetic layer: | 20 nm |

Comparative Example 1

(Magnet Transfer Master Carrier 11)

A magnetic layer was deposited under the same condition as in Example 1 on the Ni base material produced in the same manner as in Example 1. Without depositing a soft magnetic layer, evaluation was made in the same manner as in Example 1.

TABLE 1

| | Master carrier | Thickness of magnetic layer w1 (nm) | Thickness of soft magnetic layer w2 (nm) | w2/w1 | Evaluation Hc (KOe) | Mr (emu/cc) | SNR (dB) |
|---|---|---|---|---|---|---|---|
| Example 1 | 1 | 20 | 2 | 0.1 | 2.09 | 770 | 12.1 |
| Example 2 | 2 | 20 | 5 | 0.25 | 1.78 | 690 | 12.7 |
| Example 3 | 3 | 20 | 10 | 0.5 | 1.46 | 580 | 13.2 |
| Example 4 | 4 | 20 | 15 | 0.75 | 1.22 | 450 | 12.9 |
| Example 5 | 5 | 20 | 20 | 1 | 0.97 | 340 | 12.5 |
| Comp. Exp. 1 | 11 | 20 | 0 | 0 | 2.24 | 810 | 11.8 |

As shown in Table 1, the magnetic transfer master carriers of Examples 1 to 5 were more effective in reducing a coercive force Hc and a residual magnetization Mr than those of the magnetic transfer master carrier of Comparative Example 1, and also had excellent results in the evaluation of servo signal quality.

However, in the range where the thickness of the soft magnetic layer w2 is 15 nm or more, the servo signal quality degraded as compared to the case where the thickness w2 of the soft magnetic layer is 10 nm. As a reason for this, it is considered that due to the excessively thick thickness of the soft magnetic layer, the line width of the convex portions was wider, resulting in the degradation of the signal quality.

What is claimed is:

1. A magnetic transfer master carrier which forms a magnetic pattern corresponding to a pattern of information to be recorded on a perpendicular magnetic recording medium when a magnetic field is applied to the perpendicular magnetic recording medium, with the magnetic master carrier and the perpendicular magnetic recording medium closely attached to each other, the carrier comprising:
   a base material having convex portions on its surface, the convex portions being provided corresponding to the pattern of information;
   a magnetic layer deposited on at least top surfaces of the convex portions, and having perpendicular magnetic anisotropy; and
   a soft magnetic layer deposited on the surface of the magnetic layer.

2. The magnetic transfer master carrier according to claim 1, wherein the ratio w2/w1 of a thickness w2 of the soft magnetic layer to a thickness w1 of the magnetic layer and is 0.1 to 0.8.

3. A magnetic transfer method comprising:
   initially magnetizing a perpendicular magnetic recording medium by applying a magnetic field thereto;
   closely attaching a magnetic transfer master carrier to the initially magnetized perpendicular magnetic recording medium; and
   magnetically transferring information on the perpendicular magnetic recording medium by applying thereto a magnetic field whose direction is opposite to the initial magnetization, with the perpendicular magnetic recording medium closely attached to the magnetic transfer master carrier;
   wherein the magnetic transfer master carrier forms a magnetic pattern corresponding to a pattern of information to be recorded on the perpendicular magnetic recording medium when a magnetic field is applied to the perpendicular magnetic recording medium, with the magnetic master carrier and the perpendicular magnetic recording medium closely attached to each other, and comprises a base material having convex portions on its surface, the convex portions being provided corresponding to the pattern of information; a magnetic layer deposited on at least top surfaces of the convex portions, and having perpendicular magnetic anisotropy; and a soft magnetic layer deposited on the surface of the magnetic layer.

4. A magnetic recording medium obtainable by a magnetic transfer method, wherein the magnetic transfer method comprises:
   initially magnetizing a perpendicular magnetic recording medium by applying a magnetic field thereto;
   closely attaching a magnetic transfer master carrier to the initially magnetized perpendicular magnetic recording medium; and
   magnetically transferring information on the perpendicular magnetic recording medium by applying thereto a magnetic field whose direction is opposite to the initial magnetization, with the perpendicular magnetic recording medium closely attached to the magnetic transfer master carrier;
   wherein the magnetic transfer master carrier forms a magnetic pattern corresponding to a pattern of information to be recorded on the perpendicular magnetic recording medium when a magnetic field is applied to the perpendicular magnetic recording medium, with the magnetic master carrier and the perpendicular magnetic recording medium closely attached to each other, and comprises a base material having convex portions on its surface, the convex portions being provided corresponding to the pattern of information; a magnetic layer deposited on at least top surfaces of the convex portions, and having perpendicular magnetic anisotropy; and a soft magnetic layer deposited on the surface of the magnetic layer.

* * * * *